(12) United States Patent
Nagatoshi

(10) Patent No.: US 10,838,179 B2
(45) Date of Patent: Nov. 17, 2020

(54) WIDE-ANGLE LENS, PROJECTION LENS, RELAY LENS, PROJECTION-TYPE DISPLAY APPARATUS, AND RELAY LENS UNIT

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 95 days.

(21) Appl. No.: 16/285,992

(22) Filed: Feb. 26, 2019

(65) Prior Publication Data
US 2019/0265444 A1 Aug. 29, 2019

(30) Foreign Application Priority Data

Feb. 28, 2018 (JP) ................. 2018-035612
Feb. 7, 2019 (JP) ................. 2019-021040

(51) Int. Cl.
*G02B 13/06* (2006.01)
*G02B 13/00* (2006.01)
*G02B 13/22* (2006.01)

(52) U.S. Cl.
CPC ......... *G02B 13/06* (2013.01); *G02B 13/0095* (2013.01); *G02B 13/22* (2013.01)

(58) Field of Classification Search
CPC .................................................... G02B 13/06
USPC .......................................................... 359/725
See application file for complete search history.

(56) References Cited

U.S. PATENT DOCUMENTS

2011/0002034 A1* 1/2011 Shimo .................... G02B 13/06
359/434

FOREIGN PATENT DOCUMENTS

JP 2006-330410 A 12/2006
JP 5625904 B2 11/2014

* cited by examiner

*Primary Examiner* — James C. Jones
(74) *Attorney, Agent, or Firm* — Studebaker & Brackett PC

(57) ABSTRACT

The wide-angle lens consists of a projection lens which is disposed closer to a magnified side than an intermediate image, and a relay lens which is disposed closer to a reduced side than the intermediate image and is configured to be attachable and detachable to and from the projection lens, and satisfies the following Conditional Expressions (1) and (2)

$$0 < |FC/FC2| < 0.2 \quad (1)$$

$$0.05 < |FC2/f| < 1 \quad (2)$$

10 Claims, 9 Drawing Sheets

EXAMPLE 1a

EXAMPLE 1a

EXAMPLE 1b

EXAMPLE 1c

EXAMPLE 2a

EXAMPLE 2b

EXAMPLE 2c

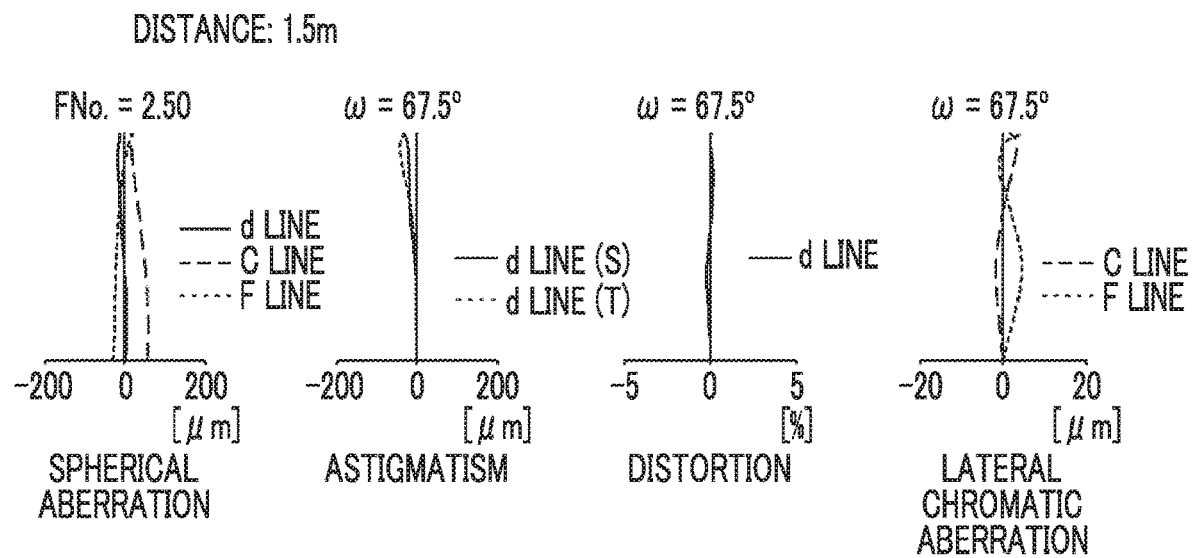
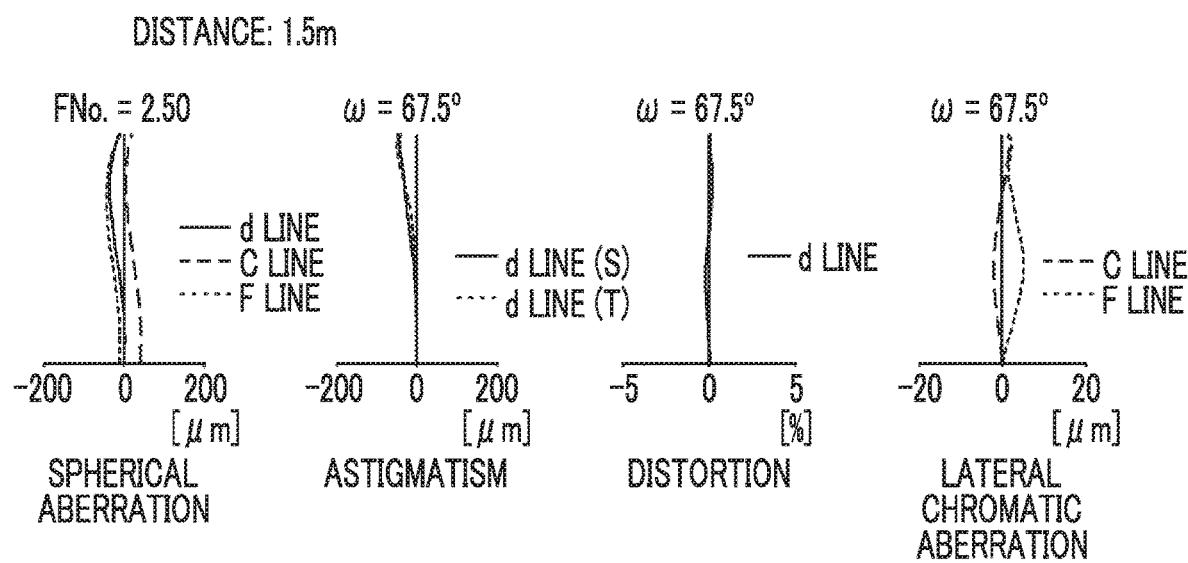

WIDE-ANGLE LENS, PROJECTION LENS, RELAY LENS, PROJECTION-TYPE DISPLAY APPARATUS, AND RELAY LENS UNIT

CROSS REFERENCE TO RELATED APPLICATIONS

The present application claims priority under 35 U.S.C. § 119 to Japanese Patent Application No. 2018-035612 filed on Feb. 28, 2018, and Japanese Patent Application No. 2019-021040 filed on Feb. 7, 2019. The above applications are hereby expressly incorporated by reference, in their entirety, into the present application.

BACKGROUND OF THE INVENTION

1. Field of the Invention

The present invention relates to a wide-angle lens that forms an intermediate image, a projection lens which is used in this wide-angle lens, a relay lens which is used in this wide-angle lens, a projection-type display apparatus including this wide-angle lens, and a relay lens unit which is used in this projection-type display apparatus.

2. Description of the Related Art

Hitherto, projection-type display apparatuses using a light valve such as a liquid crystal display device or a Digital Micromirror Device (DMD: registered trademark) have been widely used.

A wide-angle lens which is used in this type of projection-type display apparatus requires satisfactory aberration correction appropriate for the resolution of the light valve. In addition, in consideration of improving the degree of freedom of the setting of distance to a screen, high optical performance is required in which a wide angle is formed, and various aberrations are satisfactorily corrected. Further, a back focus having an appropriate length is required in order to dispose an optical system such as a prism between a light valve and a wide-angle lens.

In order to respond to such a demand, wide-angle lenses of a relay system are proposed in which an intermediate image is formed at a position conjugate to a reduced-side imaging surface, and this intermediate image is re-formed on a magnified-side imaging surface (for example, JP2006-330410A and JP5625904B).

SUMMARY OF THE INVENTION

In a projection-type display apparatus, engines including a light source and a light valve are prepared which have different specifications such as a panel size and/or a back focus in accordance with use, and a wide-angle lens corresponding to each engine is required.

The wide-angle lenses disclosed in JP2006-330410A and JP5625904B have a relay system adopted therein, to thereby hold a lens diameter on the magnified side and to achieve a long back focus. However, since aberrations are corrected in each of a lens portion on a magnified side and a lens portion on a reduced side with an intermediate image interposed therebetween, there is a problem of an increase in the number of lenses. In addition, in a case of coping with an increase in angle equal to or greater than, for example, 130°, there is a problem of an increase in a lens diameter on the magnified side. Further, as a result, in a case where multiple kinds of wide-angle lenses are arranged in order to cope with engines having different specifications, there is a problem of an increase in cost and an increase in a user's burden.

The present invention has been contrived in view of such circumstances, and an object thereof is to provide a wide-angle lens which is low in cost while holding a lens diameter on a magnified side and having a wide angle, a projection lens which is used in this wide-angle lens, a relay lens which is used in this wide-angle lens, a projection-type display apparatus including this wide-angle lens, and a relay lens unit which is used in this projection-type display apparatus.

According to the present invention, there is provided a wide-angle lens comprising: a projection lens which is disposed closer to a magnified side than an intermediate image, and a relay lens which is disposed closer to a reduced side than the intermediate image, and is configured to be attachable and detachable to and from the projection lens, in which the following Conditional Expressions (1) and (2) are satisfied in a case where a field curvature of a whole system at a maximum image height of the whole system is set to FC, a field curvature of the relay lens at the maximum image height of the whole system is set to FC2, and a focal length of the whole system is set to f.

$$0<|FC/FC2|<0.2. \tag{1}$$

$$0.05<|FC2/f|<1 \tag{2}$$

Meanwhile, it is preferable to satisfy at least one of the following Conditional Expression (1-1) or (2-1).

$$0<|FC/FC2|<0.1 \tag{1-1}$$

$$0.1<|FC2/f|<0.5 \tag{2-1}$$

In the wide-angle lens of an embodiment of the present invention, it is preferable that a plurality of the relay lenses which are combined with the projection lens are provided, and in a case where any two relay lenses out of the plurality of relay lenses are combined with the projection lens, it is preferable to satisfy the following Conditional Expression (3), and more preferable to satisfy the following Conditional Expression (3-1) in a case where a back focus of the whole system is set to Bf, a maximum image height of the whole system is set to I, a lens having a larger value of Bf×I is set to a first relay lens, and a lens having a smaller value of Bf×I is set to a second relay lens, a position at which a ray of light having a height I intersects an optical axis in the relay lens is set to a point SR in a case where the ray of light is caused to be incident in parallel with the optical axis from the reduced side of the relay lens, a distance from the point SR in the first relay lens to a vertex of a surface closest to the reduced side is set to L2r(1), a distance from the point SR in the second relay lens to the vertex of a surface closest to the reduced side is set to L2r(2), a composite focal length of all lenses closer to the reduced side than the point SR in the first relay lens is set to f2r(1), a composite focal length of all lenses closer to the reduced side than the point SR in the second relay lens is set to f2r(2), a back focus of the whole system in a case where the first relay lens is combined with the projection lens is set to Bf(1), a back focus of the whole system in a case where the second relay lens is combined with the projection lens is set to Bf(2), a maximum image height of the whole system in a case where the first relay lens is combined with the projection lens is set to I(1), and a maximum image height of the whole system in a case where the second relay lens is combined with the projection lens is set to I(2).

$$0.6 < \frac{\{L2r(1)*f2r(1)\}/\{Bf(1)*I(1)\}}{\{L2r(2)*f2r(2)\}/\{Bf(2)*I(2)\}} < 1.4 \quad (3)$$

$$0.8 < \frac{\{L2r(1)*f2r(1)\}/\{Bf(1)*I(1)\}}{\{L2r(2)*f2r(2)\}/\{Bf(2)*I(2)\}} < 1.2 \quad (3\text{-}1)$$

Meanwhile, among symbols of the respective conditional expressions, the field curvature is set to an average value between an s image plane and a t image plane. In addition, the focal length is set to a focal length in a case where a distance from a magnified-side imaging surface is infinite. In addition, L2r(1) and L2r(2) in Conditional Expression (3) are set to distances from the vertex of a surface on the reduced side of a lens including the point SR in the middle to the vertex of a surface closest to the reduced side of the relay lens in a case where the point SR is located amid a lens. In addition, in a case where the number of plurality of relay lenses which are combined with the projection lens is three or more, Conditional Expression (3) is assumed to be satisfied in all the combinations.

According to the present invention, there is provided a projection lens which is used in the above-described wide-angle lens of the embodiment of the present invention.

According to the present invention, there is provided a relay lens which is used in the above-described wide-angle lens of the embodiment of the present invention.

According to the present invention, there is provided a projection-type display apparatus comprising: a light valve from which an optical image is output based on image data; and the above described wide-angle lens, wherein the wide-angle lens projects the optical image, which is output from the light valve, onto a screen.

In the projection-type display apparatus of the embodiment of the present invention, it is preferable that a relay lens unit in which the light valve and the relay lens are formed integrally with each other is provided, and that the relay lens unit is configured to be attachable and detachable to and from the projection lens.

According to the present invention, there is provided a relay lens unit which is used in the above-described projection-type display apparatus of the embodiment of the present invention.

According to the present invention, there is provided a wide-angle lens that consists of a projection lens which is disposed closer to the magnified side than an intermediate image and at least one relay lens which is disposed closer to the reduced side than the intermediate image, in which the relay lens is configured to be attachable and detachable to and from the projection lens, and the following Conditional Expressions (1) and (2) are satisfied in a case where a field curvature of a whole system at a maximum image height of the whole system is set to FC, a field curvature of the relay lens at the maximum image height of the whole system is set to FC2, and a focal length of the whole system is set to f. Therefore, it is possible to provide a wide-angle lens which is low in cost while holding a lens diameter on a magnified side and having a wide angle, a projection lens which is used in this wide-angle lens, a relay lens which is used in this wide-angle lens, a projection-type display apparatus including this wide-angle lens, and a relay lens unit which is used in this projection-type display apparatus.

$$0 < |FC/FC2| < 0.2 \quad (1)$$

$$0.05 < |FC2/f| < 1 \quad (2)$$

BRIEF DESCRIPTION OF THE DRAWINGS

FIG. 7 is a diagram of aberrations of the wide-angle lens of Example 1a of the present invention.

FIG. 8 is a diagram of aberrations of the wide-angle lens of Example 1b of the present invention.

DESCRIPTION OF THE PREFERRED EMBODIMENTS

Figure 1:
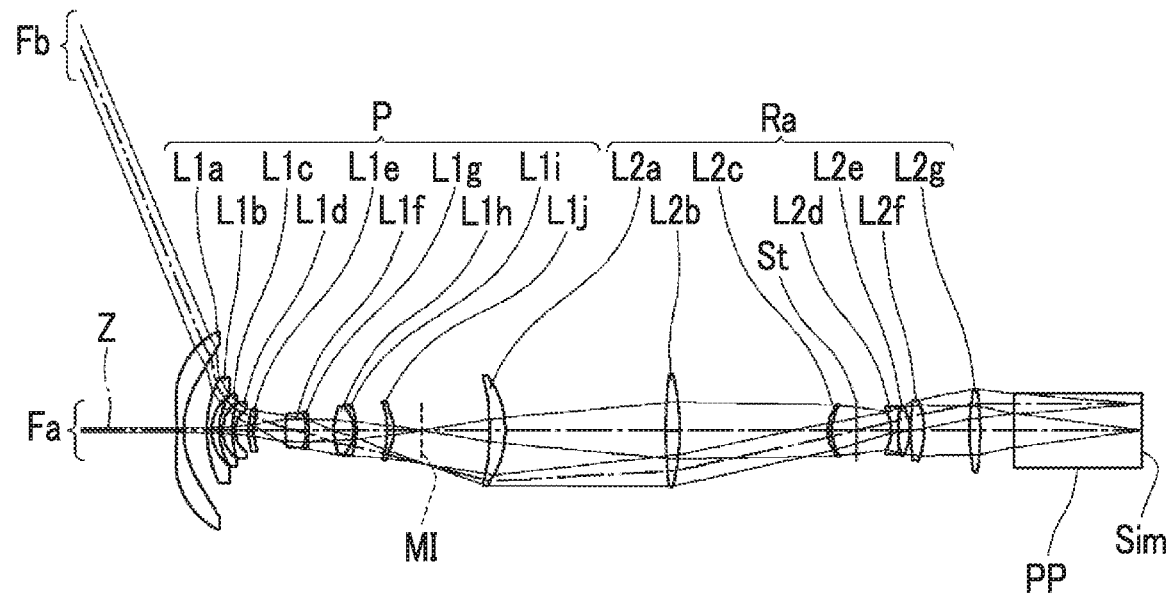
FIG. 1 is a cross-sectional view illustrating a lens configuration of a wide-angle lens (in common with that of Example 1a) according to an embodiment of the present invention.

Hereinafter, an embodiment of the present invention will be described in detail with reference to the accompanying drawings. FIG. 1 is a cross-sectional view illustrating a lens configuration of a wide-angle lens according to an embodiment of the present invention. The configuration example shown in FIG. 1 is in common with the configuration of a wide-angle lens of Example 1a described later. In FIG. 1, the left side is a magnified side, the right side is a reduced side, and an on-axis light flux Fa and a light flux Fb of maximum angle of view as light fluxes are shown together.

This wide-angle lens is mounted on, for example, a projection-type display apparatus, and can be used in projecting image information displayed on a light valve onto a screen. In FIG. 1, on the assumption of a case of being mounted on the projection-type display apparatus, an optical member PP assumed to be a filter, a prism and the like which are used in a color synthesis portion or an illumination light separation portion, and an image display surface Sim of the light valve are also shown together. In the projection-type display apparatus, a light flux to which image information is given on the image display surface Sim on an image display device is incident on this wide-angle lens through the optical member PP, and is projected onto a screen, not shown, by this wide-angle lens.

As shown in FIG. 1, the wide-angle lens of the present embodiment is composed of a projection lens P disposed closer to the magnified side than an intermediate image MI, and a relay lens Ra, disposed closer to a reduced side than the intermediate image MI, which is configured to be attachable and detachable to and from the projection lens P. Meanwhile, in FIG. 1, the intermediate image MI is schematically shown, and its actual shape is not shown.

In this manner, in the wide-angle lens that forms the intermediate image MI, it is possible to secure a back focus having an appropriate length, to reduce a lens diameter on the magnified side, and to form a configuration appropriate to an increase in angle.

In the projection-type display apparatus, engines including a light source and a light valve are prepared which have different specifications such as a panel size and/or a back focus in accordance with use, and a wide-angle lens corresponding to each engine is required. On the other hand, the angle of view is required to be a wide angle equal to or greater than, for example, 130° regardless of the specification of an engine.

In the wide-angle lens of the present embodiment, the intermediate image MI is formed at a position conjugate to a reduced-side imaging surface (image display surface Sim), and a relay system is adopted in which this intermediate image MI is re-formed on a magnified-side imaging surface (screen which is not shown). The specification such as a panel size and/or a back focus can be determined by the configuration of the relay lens Ra, the specification of the angle of view can be determined by the configuration of the projection lens P.

Therefore, as described above, in a case where multiple kinds of wide-angle lenses are arranged in order to cope with different engines by configuring the relay lens Ra to be attachable and detachable to and from the projection lens P, the projection lens P that takes charge of the specification of the angle of view is used in common, and only the relay lens Ra that takes charge of specifications such as a panel size and/or a back focus is replaced, whereby costs can be made lower than in a case where the entire wide-angle lens is replaced. In addition, since the projection lens P is used in common in a case where multiple kinds of wide-angle lenses are designed, only the relay lens Ra has only to be designed, and thus the cost of a simplex wide-angle lens can also be made lower.

In addition, the wide-angle lens of the present embodiment is configured to satisfy Conditional Expressions (1) and (2) in a case where the field curvature of the whole system at the maximum image height of the whole system is set to FC, the field curvature of the relay lens Ra at the maximum image height of the whole system is set to FC2, and the focal length of the whole system is set to f.

$$0<|FC/FC2|<0.2 \tag{1}$$

$$0.05<|FC2/f|<1 \tag{2}$$

It is not necessary to satisfactorily correct the field curvature in each of the projection lens P and the relay lens Ra by satisfying Conditional Expression (1). Even in a case where the field curvature is not satisfactorily corrected in each of the projection lens P and the relay lens Ra, the field curvature of the whole system has only to be satisfactorily corrected in a state where the projection lens P and the relay lens Ra are combined, and thus the numbers of lenses of the projection lens P and the relay lens Ra are suppressed, which leads to the advantage of a reduction in the size of the wide-angle lens and a reduction in cost. Meanwhile, in a case where Conditional Expression (1-1) is satisfied, it is possible to make characteristics more satisfactory.

$$0<|FC/FC2|<0.1 \tag{1-1}$$

The value (FC2/f) is not set to be equal to or less than the lower limit of Conditional Expression (2), and thus it is not necessary to satisfactorily correct the field curvature in each of the projection lens P and the relay lens Ra. Even in a case where the field curvature is not satisfactorily corrected in each of the projection lens P and the relay lens Ra, the field curvature of the whole system has only to be satisfactorily corrected in a state where the projection lens P and the relay lens Ra are combined, and thus the numbers of lenses of the projection lens P and the relay lens Ra are suppressed, which leads to the advantage of a reduction in the size of the wide-angle lens and a reduction in cost. The value (FC2/f) is not set to be equal to or greater than the upper limit of Conditional Expression (2), and thus the field curvature of the relay lens Ra is suppressed, which leads to the advantage of the suppression of the field curvature of the whole system in a state where the projection lens P and the relay lens Ra are combined. Meanwhile, in a case where Conditional Expression (2-1) is satisfied, it is possible to make characteristics more satisfactory.

$$0.1<|FC2/f|<0.5 \tag{2-1}$$

Figure 2:
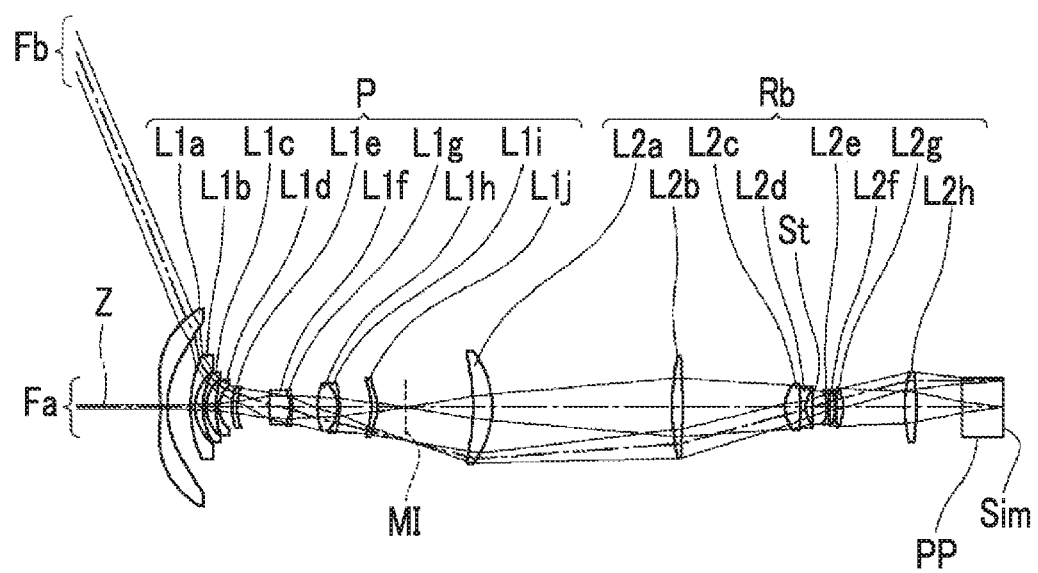
FIG. 2 is a cross-sectional view illustrating a lens configuration of a wide-angle lens of Example 1b of the present invention.
Figure 3:
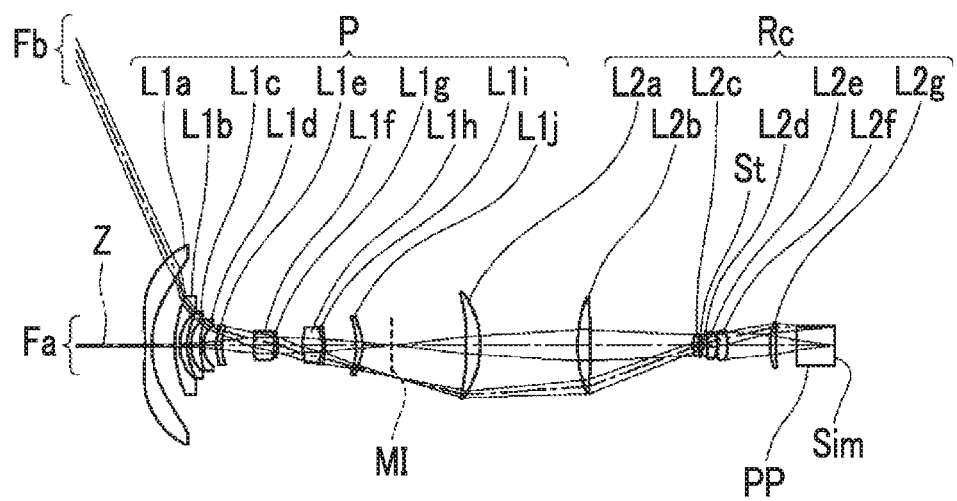
FIG. 3 is a cross-sectional view illustrating a lens configuration of a wide-angle lens of Example 1c of the present invention.

In the wide-angle lens of the present embodiment, a plurality of relay lenses combined with the projection lens P can be included as a set as with, for example, a relay lens Rb shown in FIG. 2 and a relay lens Rc shown in FIG. 3, in addition to the relay lens Ra. In this case, in a case where any two relay lenses out of a plurality of relay lenses are combined with the projection lens, it is preferable to satisfy the following Conditional Expression (3) in a case where a back focus of the whole system is set to Bf, a maximum image height of the whole system is set to 1, a lens having a larger value of Bf×I is set to a first relay lens, and a lens having a smaller value of Bf×I is set to a second relay lens, a position at which a ray of light having a height I intersects an optical axis Z in the relay lens is set to a point SR in a case where the ray of light is caused to be incident in parallel with the optical axis from a reduced side of the relay lens, a distance from the point SR in the first relay lens to a vertex of a surface closest to the reduced side is set to L2r(1), a distance from the point SR in the second relay lens to the vertex of a surface closest to the reduced side is set to L2r(2), a composite focal length of all lenses closer to the reduced side than the point SR in the first relay lens is set to f2r(1), a composite focal length of all lenses closer to the reduced side than the point SR in the second relay lens is set to f2r(2), a back focus of the whole system in a case where the first relay lens is combined with the projection lens P is set to Bf(1), a back focus of the whole system in a case where the second relay lens is combined with the projection lens P is set to Bf(2), a maximum image height of the whole system in a case where the first relay lens is combined with the projection lens P is set to I(1), and a maximum image height of the whole system in a case where the second relay lens is combined with the projection lens P is set to I(2).

By satisfying Conditional Expression (3), all the relay lenses capable of being combined with the projection lens P are advantageous for satisfactorily correcting various aberrations of the whole system in a state of being combined with the projection lens P, and are also advantageous for reducing the size of the whole system. Meanwhile, in a case where the following Conditional Expression (3-1) is satisfied, it is possible to make characteristics more satisfactory.

$$0.6 < \frac{\{L2r(1)*f2r(1)\}/\{Bf(1)*I(1)\}}{\{L2r(2)*f2r(2)\}/\{Bf(2)*I(2)\}} < 1.4 \qquad (3)$$

$$0.8 < \frac{\{L2r(1)*f2r(1)\}/\{Bf(1)*I(1)\}}{\{L2r(2)*f2r(2)\}/\{Bf(2)*I(2)\}} < 1.2 \qquad (3\text{-}1)$$

Next, numerical value examples of the wide-angle lens of the embodiment of the present invention will be described. First, a wide-angle lens of Example 1a will be described. FIG. 1 shows a cross-sectional view illustrating a lens configuration of the wide-angle lens of Example 1a. In FIG. 1 and FIGS. 2 to 6 corresponding to Examples 1b to 2c described later, the left side is a magnified side, the right side is a reduced side, and an on-axis light flux Fa and a light flux Fb of maximum angle of view as light fluxes are shown together.

The wide-angle lens of Example 1a is composed of the projection lens P which is disposed closer to the magnified side than the intermediate image MI, and the relay lens Ra which is disposed closer to the reduced side than the intermediate image MI and is configured to be attachable and detachable to and from the projection lens P. The projection lens P is composed of ten lenses, that is, lenses L1a to lens L1j. The relay lens Ra is composed of seven lenses, that is, lenses L2a to lens L2g.

Table 1 shows basic lens data of the wide-angle lens of Example 1a, Table 2 shows data relating to specifications, and Table 3 shows data relating to aspherical coefficients. In the following, the meanings of symbols in the tables will be described by taking an example of those in Example 1a, but the same is basically true of Examples 1b to 2c.

In the lens data of Table 1, the column of a surface number shows surface numbers sequentially increasing toward the reduced side with the surface of an element closest to the magnified side regarded as a first surface, the column of a curvature radius shows curvature radii of respective surfaces, and the column of a surface distance shows distances on the optical axis Z between the respective surfaces and the next surfaces. In addition, the column of n shows refractive indexes of respective optical elements at a d line (a wavelength of 587.6 nm (nanometer)), and the column of ν shows Abbe numbers of the respective optical elements at the d line (a wavelength of 587.6 nm (nanometer)). In addition, the sign of the curvature radius is set to be positive in a case where a surface shape is convex on the magnified side, and is set to be negative in a case where a surface shape is convex on the reduced side. The basic lens data also shows the aperture stop St and the optical member PP together. In the place of a surface number of a surface equivalent to the aperture stop St, a term of (stop) is written together with the surface number.

The data relating to specifications of Table 2 shows values of a focal length |f|, a back focus Bf, an F-Number FNo., and the total angle of view 2ω(°).

In the lens data of Table 1, mark * is attached to the surface number of an aspherical surface, and the numerical values of a paraxial curvature radius are indicated as the curvature radius of the aspherical surface. The data relating to the aspherical coefficients of Table 3 indicates surface numbers of the aspherical surfaces and aspherical coefficients relating to these aspherical surfaces. "E±n" (n is an integer) in the numerical values of the aspherical coefficients of Table 4 means "×10±n". The aspherical coefficients are values of respective coefficients KA and Am in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, KA and Am are aspherical coefficients, and Σ at an aspherical depth Zd means a total sum for m.

For the basic lens data and the data relating to specifications, a degree (°) is used as the unit of an angle, and mm (millimeter) is used as the unit of a length, but it is also possible to use other appropriate units since an optical system can be used even in a case where the optical system is magnified or reduced in proportion.

TABLE 1

Example 1a • Lens data (n and ν are based on d line)

| Surface Number | Curvature Radius | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 65.8589 | | |
| 19 | −145.5518 | 10.7319 | 1.77250 | 49.60 |
| 20 | −62.3071 | 109.1401 | | |
| 21 | 318.5191 | 9.2901 | 1.64769 | 33.79 |
| 22 | −181.9989 | 101.7771 | | |
| 23 | 27.4511 | 2.8745 | 1.53172 | 48.84 |
| 24 | 33.1955 | 16.8747 | | |
| 25 (Stop) | ∞ | 23.7186 | | |
| 26 | −27.7688 | 4.7775 | 1.85478 | 24.80 |
| 27 | 89.9979 | 0.1894 | | |
| 28 | 98.9499 | 7.8157 | 1.49700 | 81.54 |
| 29 | −37.0085 | 0.5627 | | |
| 30 | 127.2844 | 9.0281 | 1.49700 | 81.54 |
| 31 | −63.6949 | 31.2965 | | |
| 32 | 147.0807 | 7.3952 | 1.89286 | 20.36 |
| 33 | −193.5461 | 23.0227 | | |
| 34 | ∞ | 88.0000 | 1.51633 | 64.14 |
| 35 | ∞ | | | |

TABLE 2

Example 1a • Specifications (d line)

| | |
|---|---|
| |f| | 7.46 |
| Bf | 81.02 |
| FNo. | 2.50 |
| 2ω [°] | 135.0 |

TABLE 3

Example 1a • Aspherical coefficients

| | Surface Number | | | |
|---|---|---|---|---|
| | 1 | 2 | 17 | 18 |
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| | Surface Number | |
|---|---|---|
| | 9 | 10 |
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

FIG. 7 shows a diagram of aberrations of the wide-angle lens of Example 1a. Meanwhile, spherical aberration, astigmatism, distortion, and lateral chromatic aberration in a case where a distance from the magnified-side imaging surface to the projection lens P is set to 1.5 m are shown in order from the left side in FIG. 7. The diagram of aberrations indicating spherical aberration, astigmatism, and distortion shows aberrations in which the d line (a wavelength of 587.6 nm (nanometer)) is used as a reference wavelength. In the spherical aberration diagram, aberrations relating to the d line (a wavelength of 587.6 nm (nanometer)), a C line (a wavelength of 656.3 nm (nanometer)), and an F line (a wavelength of 486.1 nm (nanometer)) are shown by a solid line, a long dashed line, and a short dashed line. In the astigmatism diagram, aberrations in a sagittal direction and a tangential direction are shown by a solid line and a short dashed line, respectively. In the lateral chromatic aberration diagram, aberrations relating to the C line (a wavelength of 656.3 nm (nanometer)) and the F line (a wavelength of 486.1 nm (nanometer)) are shown by a long dashed line and a short dashed line, respectively. Meanwhile, FNo. in the spherical aberration diagram means an F-Number, and ω in the other aberration diagrams means a half angle of view.

Next, a wide-angle lens of Example 1b will be described. FIG. 2 shows a cross-sectional view illustrating a lens configuration of the wide-angle lens of Example 1b. The wide-angle lens of Example 1b is composed of the projection lens P which is disposed closer to the magnified side than the intermediate image MI and is in common with that in Example 1a, and a relay lens Rb which is disposed closer to the reduced side than the intermediate image MI and is configured to be attachable and detachable to and from the projection lens P. The relay lens Rb is composed of eight lenses, that is, lenses L2a to lens L2h. In addition, Table 4 shows basic lens data of the wide-angle lens of Example 1 b, Table 5 shows data relating to specifications, Table 6 shows data relating to aspherical coefficients, and FIG. 8 shows a diagram of aberrations in a case where a distance from the magnified-side imaging surface to the projection lens P is set to 1.5 m.

TABLE 4

Example 1b • Lens data (n and ν are based on d line)

| Surface Number | Curvature Radius | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 65.3564 | | |
| 19 | −156.0746 | 13.2953 | 1.77250 | 49.60 |
| 20 | −62.6880 | 122.5587 | | |
| 21 | 163.0959 | 7.4701 | 1.85026 | 32.27 |
| 22 | −352.6655 | 69.9998 | | |
| 23 | 25.9154 | 10.2271 | 1.49700 | 81.54 |
| 24 | −215.5107 | 4.0091 | 1.51742 | 52.43 |
| 25 | 19.8552 | 4.6902 | | |
| 26 (Stop) | ∞ | 9.7247 | | |
| 27 | −26.8569 | 1.2006 | 1.85478 | 24.80 |
| 28 | 96.6154 | 0.2449 | | |
| 29 | 142.0026 | 4.2556 | 1.49700 | 81.54 |
| 30 | −34.4511 | 0.1996 | | |
| 31 | 92.4923 | 5.0758 | 1.49700 | 81.54 |
| 32 | −35.2584 | 42.2219 | | |
| 33 | 92.7669 | 7.9994 | 1.89286 | 20.36 |
| 34 | −223.0200 | 31.0168 | | |

TABLE 4-continued

Example 1b • Lens data (n and ν are based on d line)

| Surface Number | Curvature Radius | Surface Distance | n | ν |
|---|---|---|---|---|
| 35 | ∞ | 29.0000 | 1.51633 | 64.14 |
| 36 | ∞ | | | |

TABLE 5

Example 1b • Specifications (d line)

| | |
|---|---|
| \|f\| | 7.46 |
| Bf | 50.11 |
| FNo. | 2.50 |
| 2ω [°] | 135.0 |

TABLE 6

Example 1b • Aspherical coefficients

Surface Number

| | 1 | 2 | 17 | 18 |
|---|---|---|---|---|
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

Surface Number

| | 9 | 10 |
|---|---|---|
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 9:
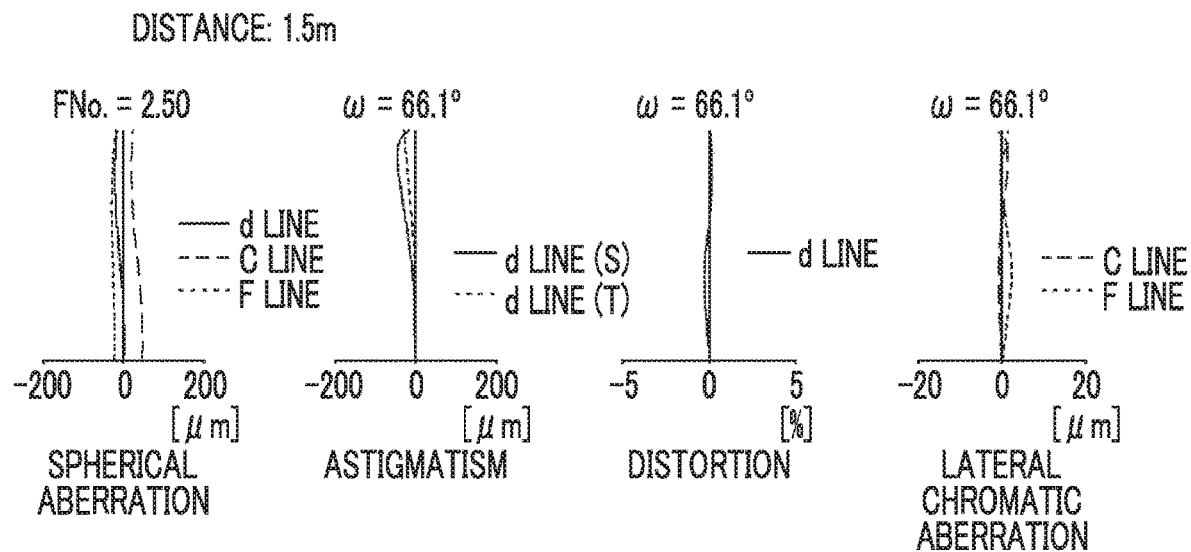
FIG. 9 is a diagram of aberrations of the wide-angle lens of Example 1c of the present invention.

Next, a wide-angle lens of Example 1c will be described. FIG. 3 shows a cross-sectional view illustrating a lens configuration of the wide-angle lens of Example 1c. The wide-angle lens of Example 1c is composed of the projection lens P which is disposed closer to the magnified side than the intermediate image MI and is in common with that in Example 1a, and a relay lens Rc which is disposed closer to the reduced side than the intermediate image MI and is configured to be attachable and detachable to and from the projection lens P. The relay lens Rc is composed of seven lenses, that is, lenses L2a to lens L2g. In addition, Table 7 shows basic lens data of the wide-angle lens of Example 1c, Table 8 shows data relating to specifications, Table 9 shows data relating to aspherical coefficients, and FIG. 9 shows a diagram of aberrations in a case where a distance from the magnified-side imaging surface to the projection lens P is set to 1.5 m.

TABLE 7

Example 1c • Lens data (n and ν are based on d line)

| Surface Number | Curvature Radius | Surface Distance | n | ν |
|---|---|---|---|---|
| *1 | −44.3204 | 5.0000 | 1.53158 | 55.08 |
| *2 | −1417.0510 | 15.4100 | | |
| 3 | 82.4188 | 3.2750 | 1.58913 | 61.13 |
| 4 | 30.7666 | 5.3165 | | |
| 5 | 45.6383 | 2.1543 | 1.89190 | 37.13 |
| 6 | 24.2352 | 6.8248 | | |
| 7 | 64.4999 | 1.7533 | 1.71299 | 53.87 |
| 8 | 18.3631 | 8.9822 | | |
| *9 | 30.4215 | 3.7176 | 1.58573 | 59.70 |
| *10 | 28.3248 | 21.8359 | | |
| 11 | 49.0386 | 13.9993 | 1.80400 | 46.58 |
| 12 | −32.0595 | 2.0000 | 1.80518 | 25.46 |
| 13 | −80.4358 | 17.4526 | | |
| 14 | 48.2890 | 13.4356 | 1.49700 | 81.54 |

TABLE 7-continued

Example 1c • Lens data (n and ν are based on d line)

| Surface Number | Curvature Radius | Surface Distance | n | ν |
|---|---|---|---|---|
| 15 | −23.3246 | 1.6557 | 1.84666 | 23.78 |
| 16 | −54.0229 | 21.3983 | | |
| *17 | −40.1407 | 4.4589 | 1.69350 | 53.18 |
| *18 | −22.9550 | 71.1599 | | |
| 19 | −142.1976 | 9.1576 | 1.77250 | 49.60 |
| 20 | −60.3951 | 65.7181 | | |
| 21 | 91.6324 | 8.6203 | 1.85150 | 40.78 |
| 22 | −1534.8830 | 70.0219 | | |
| 23 | 19.0446 | 3.8912 | 1.51742 | 52.43 |
| 24 | 15.0625 | 1.0169 | | |
| 25 (Stop) | ∞ | 1.9818 | | |
| 26 | −16.3944 | 3.0009 | 1.85478 | 24.80 |
| 27 | 1794.6165 | 0.2958 | | |
| 28 | −117.7123 | 6.3708 | 1.49700 | 81.54 |
| 29 | −19.0109 | 0.2168 | | |

TABLE 7-continued

Example 1c • Lens data (n and ν are based on d line)

| Surface Number | Curvature Radius | Surface Distance | n | ν |
|---|---|---|---|---|
| 30 | 57.6545 | 6.9101 | 1.49700 | 81.54 |
| 31 | −31.1924 | 28.7280 | | |
| 32 | 38.2949 | 4.2497 | 1.84666 | 23.78 |
| 33 | 152.4702 | 14.0205 | | |
| 34 | ∞ | 26.0000 | 1.51633 | 64.14 |
| 35 | ∞ | | | |

TABLE 8

Example 1c • Specifications (d line)

| | |
|---|---|
| \|f\| | 5.27 |
| Bf | 31.15 |
| FNo. | 2.50 |
| 2ω [°] | 132.2 |

TABLE 9

Example 1c • Aspherical coefficients

| | Surface Number | | | |
|---|---|---|---|---|
| | 1 | 2 | 17 | 18 |
| KA | −1.2303863707E+00 | −1.5000001669E+01 | −1.5000006838E+01 | −3.0092100119E+00 |
| A3 | 5.9348651770E−04 | 8.9304848786E−04 | −2.6044996332E−04 | −3.0355906384E−04 |
| A4 | −5.5214830356E−06 | −1.0631852523E−04 | 8.4021209852E−05 | 9.4499007790E−05 |
| A5 | −4.7810130831E−07 | 1.6534353217E−05 | −1.0673878463E−05 | −1.0477322645E−05 |
| A6 | 1.7266351409E−08 | −1.9436051391E−06 | 3.8911814665E−07 | 4.5619610724E−07 |
| A7 | −2.1944092816E−11 | 1.5601936768E−07 | 4.3612584932E−08 | 2.8491540227E−08 |
| A8 | −8.9217997578E−12 | −8.8082963749E−09 | −5.6852182400E−09 | −5.0320333080E−09 |
| A9 | 1.1835040062E−13 | 3.6001811300E−10 | 1.5814794803E−10 | 2.3054675416E−10 |
| A10 | 1.9812484654E−15 | −1.0802949795E−11 | 1.4949203793E−11 | 7.7515084926E−12 |
| A11 | −5.0437871041E−17 | 2.3804482681E−13 | −1.2466380258E−12 | −1.1637237572E−12 |
| A12 | −7.2259851204E−20 | −3.8040779225E−15 | 4.8429489777E−15 | 1.9481835700E−14 |
| A13 | 8.9232672372E−21 | 4.2866646933E−17 | 2.4463805447E−15 | 1.8097312178E−15 |
| A14 | −3.7905184864E−23 | −3.2283777031E−19 | −5.8765544839E−17 | −6.3286247217E−17 |
| A15 | −5.9481059180E−25 | 1.4583676280E−21 | −1.5683277766E−18 | −6.6718610062E−19 |
| A16 | 4.3440764840E−27 | −2.9891167401E−24 | 5.4529421685E−20 | 3.6577415411E−20 |

| | Surface Number | |
|---|---|---|
| | 9 | 10 |
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 4:
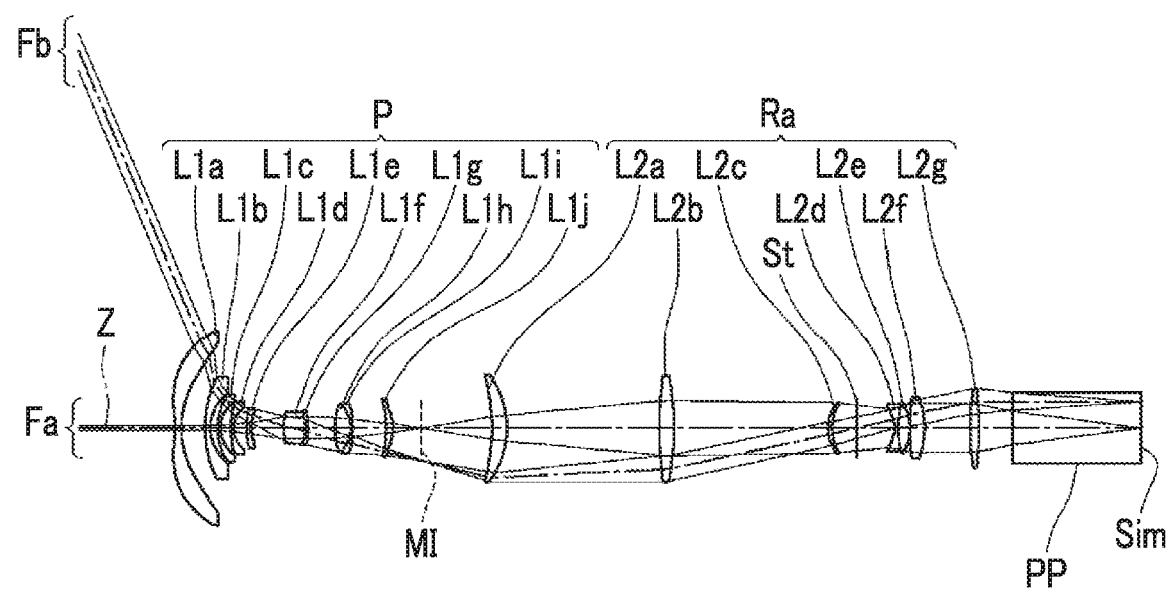
FIG. 4 is a cross-sectional view illustrating a lens configuration of a wide-angle lens of Example 2a of the present invention.
Figure 10:
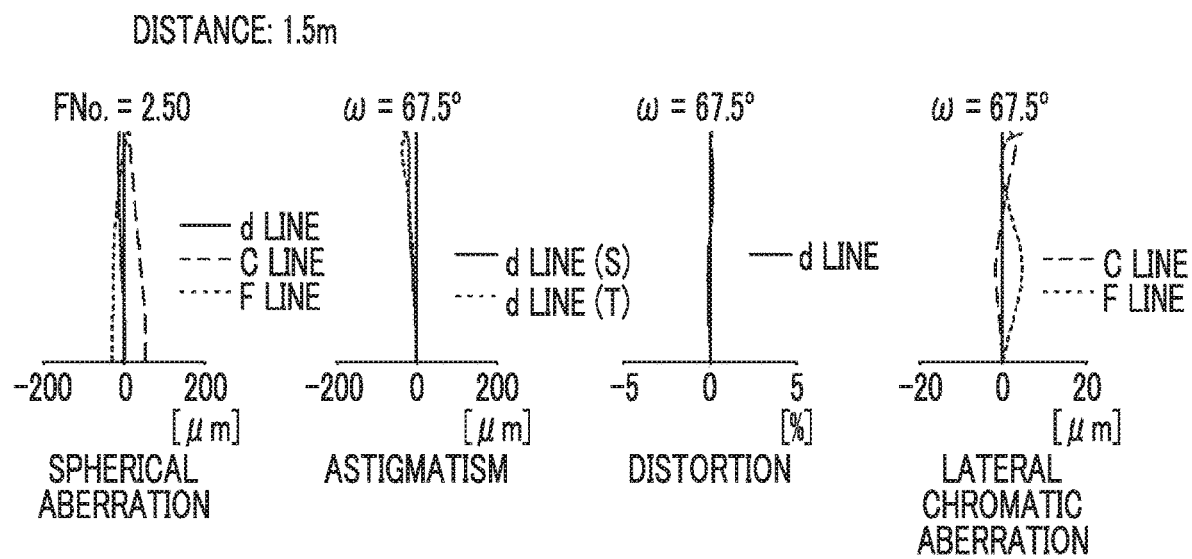
FIG. 10 is a diagram of aberrations of the wide-angle lens of Example 2a of the present invention.

Next, a wide-angle lens of Example 2a will be described. FIG. 4 shows a cross-sectional view illustrating a lens configuration of the wide-angle lens of Example 2a. The wide-angle lens of Example 2a is composed of the projection lens P which is disposed closer to the magnified side than the intermediate image MI, and the relay lens Ra which is disposed closer to the reduced side than the intermediate image MI and is configured to be attachable and detachable to and from the projection lens P. The projection lens P is composed of ten lenses, that is, lenses L1a to lens L1j. The relay lens Ra is composed of seven lenses, that is, lenses L2a to lens L2g. In addition, Table 10 shows basic lens data of the wide-angle lens of Example 2a, Table 11 shows data relating to specifications, Table 12 shows data relating to aspherical coefficients, and FIG. 10 shows a diagram of aberrations in a case where a distance from the magnified-side imaging surface to the projection lens P is set to 1.5 m.

TABLE 10

Example 2a • Lens data (n and ν are based on d line)

| Surface Number | Curvature Radius | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |

TABLE 10-continued

Example 2a • Lens data (n and ν are based on d line)

| Surface Number | Curvature Radius | Surface Distance | n | ν |
|---|---|---|---|---|
| 15 | −23.0827 | 1.5448 | 1.84666 | 23.78 |
| 16 | −52.9491 | 22.7616 | | |
| *17 | −44.7718 | 4.4646 | 1.69350 | 53.18 |
| *18 | −24.1589 | 67.8193 | | |
| 19 | −143.6049 | 10.2869 | 1.77250 | 49.60 |
| 20 | −63.4858 | 104.6763 | | |
| 21 | 314.4582 | 10.0009 | 1.64769 | 33.79 |
| 22 | −183.5563 | 105.4353 | | |
| 23 | 27.9061 | 2.8037 | 1.53172 | 48.84 |
| 24 | 33.6391 | 16.8130 | | |
| 25 (Stop) | ∞ | 24.9860 | | |

TABLE 10-continued

Example 2a • Lens data (n and ν are based on d line)

| Surface Number | Curvature Radius | Surface Distance | n | ν |
|---|---|---|---|---|
| 26 | −27.9904 | 2.9125 | 1.85478 | 24.80 |
| 27 | 88.3774 | 0.1534 | | |
| 28 | 95.2615 | 7.6028 | 1.49700 | 81.54 |
| 29 | −37.2489 | 0.0298 | | |
| 30 | 134.3759 | 10.3731 | 1.49700 | 81.54 |
| 31 | −58.7490 | 30.9014 | | |
| 32 | 143.1924 | 6.4573 | 1.89286 | 20.36 |
| 33 | −191.1719 | 23.0216 | | |
| 34 | ∞ | 88.0000 | 1.51633 | 64.14 |
| 35 | ∞ | | | |

TABLE 11

Example 2a • Specifications (d line)

| | |
|---|---|
| \|f\| | 7.46 |
| Bf | 81.02 |
| FNo. | 2.50 |
| 2ω [°] | 135.0 |

TABLE 12

Example 2a • Aspherical coefficients

| | Surface Number | | | |
|---|---|---|---|---|
| | 1 | 2 | 17 | 18 |
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| | Surface Number | |
|---|---|---|
| | 9 | 10 |
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 5:
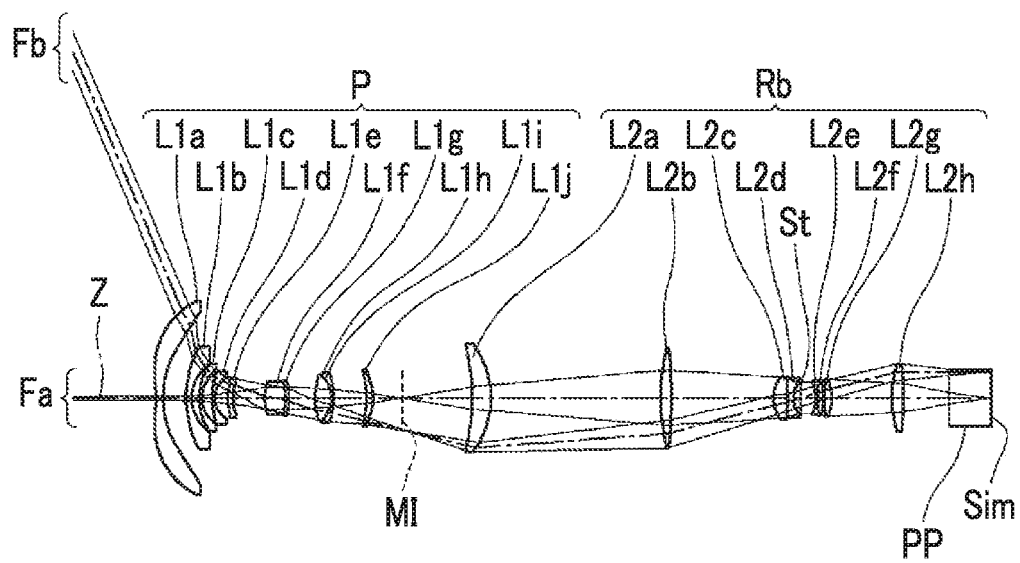
FIG. 5 is a cross-sectional view illustrating a lens configuration of a wide-angle lens of Example 2b of the present invention.
Figure 11:
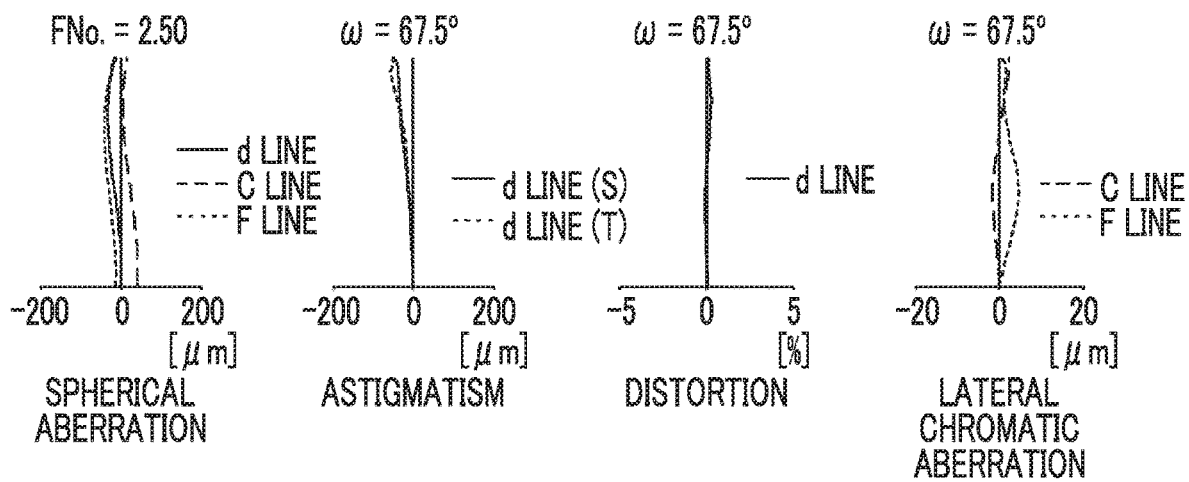
FIG. 11 is a diagram of aberrations of the wide-angle lens of Example 2b of the present invention.

Next, a wide-angle lens of Example 2b will be described. FIG. 5 shows a cross-sectional view illustrating a lens configuration of the wide-angle lens of Example 2b. The wide-angle lens of Example 2b is composed of the projection lens P which is disposed closer to the magnified side than the intermediate image MI and is in common with that in Example 2a, and the relay lens Rb which is disposed closer to the reduced side than the intermediate image MI and is configured to be attachable and detachable to and from the projection lens P. The relay lens Rb is composed of eight lenses, that is, lenses L2a to lens L2h. In addition, Table 13 shows basic lens data of the wide-angle lens of Example 2b, Table 14 shows data relating to specifications, Table 15 shows data relating to aspherical coefficients, and FIG. 11 shows a diagram of aberrations in a case where a distance from the magnified-side imaging surface to the projection lens P is set to 1.5 m.

TABLE 13

Example 2b • Lens data (n and ν are based on d line)

| Surface Number | Curvature Radius | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |
| 15 | −23.0827 | 1.5448 | 1.84666 | 23.78 |
| 16 | −52.9491 | 22.7616 | | |

TABLE 13-continued

Example 2b • Lens data (n and ν are based on d line)

| Surface Number | Curvature Radius | Surface Distance | n | ν |
|---|---|---|---|---|
| *17 | −44.7718 | 4.4646 | 1.69350 | 53.18 |
| *18 | −24.1589 | 67.6099 | | |
| 19 | −163.6408 | 12.9937 | 1.77250 | 49.60 |
| 20 | −64.5328 | 115.6168 | | |
| 21 | 164.3957 | 7.2654 | 1.85026 | 32.27 |
| 22 | −348.1374 | 70.0002 | | |
| 23 | 25.9355 | 9.9110 | 1.49700 | 81.54 |

TABLE 13-continued

Example 2b • Lens data (n and ν are based on d line)

| Surface Number | Curvature Radius | Surface Distance | n | ν |
|---|---|---|---|---|
| 24 | −173.3571 | 3.6793 | 1.51742 | 52.43 |
| 25 | 20.0589 | 4.9101 | | |
| 26 (Stop) | ∞ | 10.3563 | | |
| 27 | −27.2389 | 1.1992 | 1.85478 | 24.80 |
| 28 | 1.09.7700 | 0.2577 | | |
| 29 | 178.0032 | 4.2013 | 1.49700 | 81.54 |
| 30 | −34.2999 | 0.1996 | | |
| 31 | 91.9048 | 5.1261 | 1.49700 | 81.54 |
| 32 | −36.0905 | 41.2675 | | |
| 33 | 87.7647 | 7.9994 | 1.89286 | 20.36 |
| 34 | −264.6701 | 31.0168 | | |
| 35 | ∞ | 29.0000 | 1.51633 | 64.14 |
| 36 | ∞ | | | |

TABLE 14

Example 2b • Specifications (d line)

| |f| | 7.46 |
|---|---|
| Bf | 50.11 |
| FNo. | 2.50 |
| 2ω [°] | 135.0 |

TABLE 15

Example 2b • Aspherical coefficients

| Surface Number | | | | |
|---|---|---|---|---|
| | 1 | 2 | 17 | 18 |
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−07 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| Surface Number | | |
|---|---|---|
| | 9 | 10 |
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Figure 6:
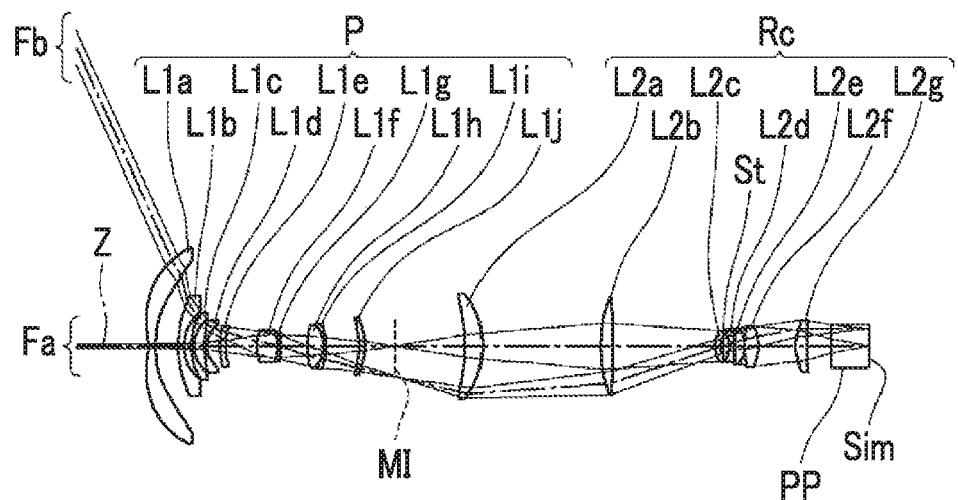
FIG. 6 is a cross-sectional view illustrating a lens configuration of a wide-angle lens of Example 2c of the present invention.
Figure 12:
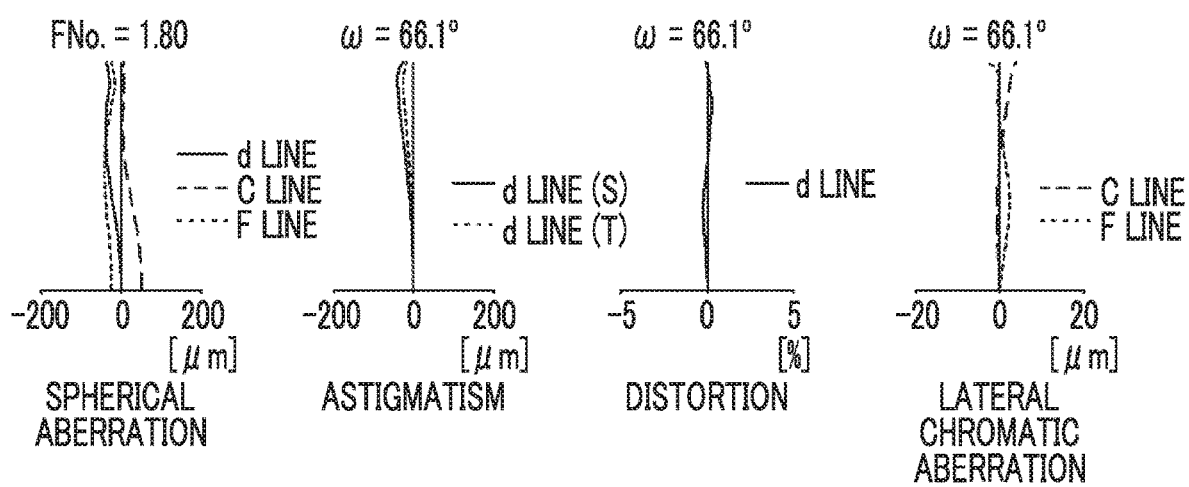
FIG. 12 is a diagram of aberrations of the wide-angle lens of Example 2c of the present invention.

Next, a wide-angle lens of Example 2c will be described. FIG. 6 shows a cross-sectional view illustrating a lens configuration of the wide-angle lens of Example 2c. The wide-angle lens of Example 2c is composed of the projection lens P which is disposed closer to the magnified side than the intermediate image MI and is in common with that in Example 2a, and the relay lens Rc which is disposed closer to the reduced side than the intermediate image MI and is configured to be attachable and detachable to and from the projection lens P. The relay lens Rc is composed of seven lenses, that is, lenses L2a to lens L2g. In addition, Table 16 shows basic lens data of the wide-angle lens of Example 2c, Table 17 shows data relating to specifications, Table 18 shows data relating to aspherical coefficients, and FIG. 12 shows a diagram of aberrations in a case where a distance from the magnified-side imaging surface to the projection lens P is set to 1.5 m.

TABLE 16

Example 2c • Lens data (n and ν are based on d line)

| Surface Number | Curvature Radius | Surface Distance | n | ν |
|---|---|---|---|---|
| *1 | −45.2918 | 5.0000 | 1.53158 | 55.08 |
| *2 | −1637.7166 | 15.5147 | | |
| 3 | 80.1260 | 3.8139 | 1.58913 | 61.13 |
| 4 | 30.2910 | 4.9436 | | |
| 5 | 43.4922 | 2.1225 | 1.89190 | 37.13 |
| 6 | 23.9833 | 7.0501 | | |
| 7 | 70.9595 | 1.7361 | 1.71299 | 53.87 |
| 8 | 18.2324 | 8.6885 | | |
| *9 | 29.8905 | 3.6571 | 1.58573 | 59.70 |
| *10 | 27.8914 | 22.0721 | | |
| 11 | 48.9527 | 14.0009 | 1.80400 | 46.58 |
| 12 | −32.4920 | 2.0000 | 1.80518 | 25.46 |
| 13 | −78.5978 | 18.2768 | | |
| 14 | 51.8603 | 11.1025 | 1.49700 | 81.54 |

TABLE 16-continued

Example 2c • Lens data (n and ν are based on d line)

| Surface Number | Curvature Radius | Surface Distance | n | ν |
|---|---|---|---|---|
| 15 | −23.0827 | 1.5448 | 1.84666 | 23.78 |
| 16 | −52.9491 | 22.7616 | | |
| *17 | −44.7718 | 4.4646 | 1.69350 | 53.18 |
| *18 | −24.1589 | 67.6529 | | |

TABLE 16-continued

Example 2c • Lens data (n and ν are based on d line)

| Surface Number | Curvature Radius | Surface Distance | n | ν |
|---|---|---|---|---|
| 19 | −145.1718 | 12.2753 | 1.77250 | 49.60 |
| 20 | −60.9882 | 80.3061 | | |
| 21 | 99.0531 | 8.1994 | 1.85150 | 40.78 |
| 22 | −1021.2325 | 70.0007 | | |
| 23 | 20.4083 | 4.0009 | 1.51742 | 52.43 |
| 24 | 16.3473 | 1.3149 | | |
| 25 (Stop) | ∞ | 4.7448 | | |
| 26 | −18.4222 | 2.9997 | 1.85478 | 24.80 |
| 27 | 286.8492 | 0.3251 | | |
| 28 | −869.1801 | 6.8914 | 1.49700 | 81.54 |
| 29 | −21.8714 | 0.1991 | | |
| 30 | 76.5399 | 9.2470 | 1.49700 | 81.54 |
| 31 | −32.1345 | 25.6477 | | |
| 32 | 42.0180 | 7.4614 | 1.84666 | 23.78 |
| 33 | 155.0228 | 16.8547 | | |
| 34 | ∞ | 26.0000 | 1.51633 | 64.14 |
| 35 | ∞ | | | |

TABLE 17

Example 2c • Specifications (d line)

| | |
|---|---|
| \|f\| | 5.27 |
| Bf | 33.98 |
| FNo. | 1.80 |
| 2ω [°] | 132.2 |

TABLE 18

Example 2c • Aspherical coefficients

| | Surface Number | | | |
|---|---|---|---|---|
| | 1 | 2 | 17 | 18 |
| KA | −1.2221014805E+00 | −1.5000001648E+01 | −1.5000006838E+01 | −3.3585276537E+00 |
| A3 | 5.7304737453E−04 | 8.5671590755E−04 | −1.8352703811E−04 | −2.2740815058E−04 |
| A4 | −5.6897061273E−06 | −1.0098974063E−04 | 7.5724810060E−05 | 8.0968992110E−05 |
| A5 | −4.0249849923E−07 | 1.5468968386E−05 | −9.3182164264E−06 | −9.1971861330E−06 |
| A6 | 1.4847850208E−08 | −1.7913823233E−06 | 3.2434887330E−07 | 3.9735688741E−01 |
| A7 | −3.1630909563E−11 | 1.4192118279E−07 | 3.8965904404E−08 | 2.6827705630E−08 |
| A8 | −7.1031422861E−12 | −7.9073572376E−09 | −4.5617280600E−09 | −4.0171781330E−09 |
| A9 | 9.7310993336E−14 | 3.1884234030E−10 | 9.3250995596E−11 | 1.4898900154E−10 |
| A10 | 1.4469961180E−15 | −9.4379464150E−12 | 1.1486173647E−11 | 5.9424137899E−12 |
| A11 | −3.7877454409E−17 | 2.0517742941E−13 | −7.7505816184E−13 | −7.5109893845E−13 |
| A12 | −3.9438567779E−20 | −3.2351206356E−15 | 2.1899750816E−15 | 1.3494742326E−14 |
| A13 | 6.2092896389E−21 | 3.5967469039E−17 | 1.3382691749E−15 | 1.0972162626E−15 |
| A14 | −2.6260719097E−23 | −2.6722208863E−19 | −3.4102018743E−17 | −4.2748739079E−17 |
| A15 | −3.8434555784E−25 | 1.1907709970E−21 | −6.7779022028E−19 | −3.6867006717E−19 |
| A16 | 2.7184390330E−27 | −2.4079416426E−24 | 2.7626883300E−20 | 2.5397005616E−20 |

| | Surface Number | |
|---|---|---|
| | 9 | 10 |
| KA | 1.0000000000E+00 | 1.0000000000E+00 |
| A4 | −4.8932689363E−05 | −4.2703972942E−05 |
| A6 | 1.1659600714E−08 | 7.6369345203E−09 |
| A8 | 2.4584736304E−10 | 3.3909943650E−10 |
| A10 | −3.2048099681E−13 | −7.6316904201E−13 |

Table 19 shows values corresponding to Conditional Expressions (1) and (2) of the wide-angle lenses of Examples 1a to 2c, and (L2r×f2r)/(Bf×I) relevant to Conditional Expression (3). Meanwhile, the d line is used as a reference wavelength in all the examples, and values shown in the following Table 19 are equivalent to those at this reference wavelength.

Regarding the value of Conditional Expression (3) of Example 1, in a case where the relay lens Ra of Example 1a is set to a first relay lens, and the relay lens Rb of Example 1b is set to a second relay lens, the value of Conditional Expression (3) is equal to 0.99. In a case where the relay lens Rb of Example 1b is set to a first relay lens, and the relay lens Rc of Example 1c is set to a second relay lens, the value of Conditional Expression (3) is equal to 0.99. In a case where the relay lens Ra of Example 1a is set to a first relay lens, and the relay lens Rc of Example 1c is set to a second relay lens, the value of Conditional Expression (3) is equal to 0.98. That is, Conditional Expression (3) is satisfied in all the combinations of Example 1.

Regarding the value of Conditional Expression (3) of Example 2, in a case where the relay lens Ra of Example 2a is set to a first relay lens, and the relay lens Rb of Example 2b is set to a second relay lens, the value of Conditional Expression (3) is equal to 0.99. In a case where the relay lens Rb of Example 2b is set to a first relay lens, and the relay lens Rc of Example 2c is set to a second relay lens, the value of Conditional Expression (3) is equal to 0.89. In a case where the relay lens Ra of Example 2a is set to a first relay lens, and the relay lens Rc of Example 2c is set to a second relay lens, the value of Conditional Expression (3) is equal to 0.88. That is, Conditional Expression (3) is satisfied in all the combinations of Example 2.

TABLE 19

| Expression Number | Conditional Expression | Example 1a | Example 1b | Example 1c |
|---|---|---|---|---|
| (1) | \|FC/FC2\| | 0.02 | 0.03 | 0.02 |
| (2) | \|FC2/f\| | 0.23 | 0.24 | 0.18 |
|  | (L2r * f2r)/(Bf * I) | 4.57 | 4.61 | 4.66 |

| Expression Number | Conditional Expression | Example 2a | Example 2b | Example 2c |
|---|---|---|---|---|
| (1) | \|FC/FC2\| | 0.01 | 0.03 | 0.02 |
| (2) | \|FC2/f\| | 0.27 | 0.27 | 0.19 |
|  | (L2r * f2r)/(Bf * I) | 4.52 | 4.58 | 5.12 |

From the above-mentioned data, it can be understood that the wide-angle lenses of Examples 1a to 2c all satisfy Conditional Expressions (1) to (3), and are wide-angle lenses which are low in cost while holding a lens diameter on the magnified side and the total angle of view being as wide an angle as 130° or greater.

Figure 13:
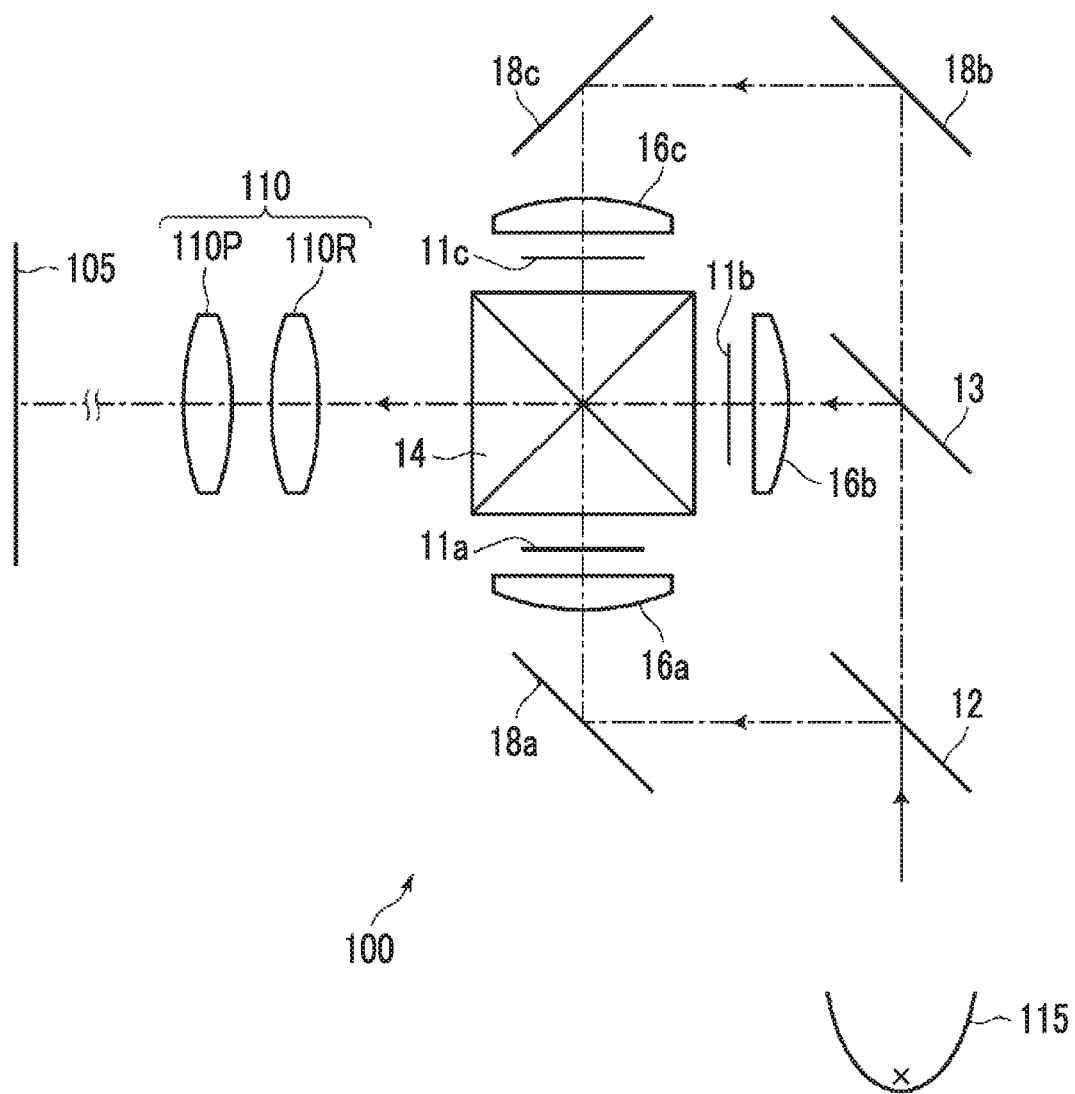
FIG. 13 is a schematic configuration diagram a projection-type display apparatus according to an embodiment of the present invention.

Next, a projection-type display apparatus according to an embodiment of the present invention will be described. FIG. 13 is a schematic configuration diagram of a projection-type display apparatus according to an embodiment of the present invention. A projection-type display apparatus 100 shown in FIG. 13 includes a wide-angle lens 110 according to an embodiment of the present invention, a light source 115, transmission-type display devices 11a to 11c as light valves compatible with respective beams of colored light, dichroic mirrors 12 and 13 for color decomposition, a cross dichroic prism 14 for color synthesis, capacitor lenses 16a to 16c, and total reflection mirrors 18a to 18c for deflecting an optical path.

The wide-angle lens 110 is composed of a projection lens 110P and a relay lens 110R. In addition, the light source 115, the transmission-type display devices (light valves) 11a to 11c, and the relay lens 110R are formed integrally with each other as a relay lens unit. This relay lens unit is configured to be attachable and detachable to and from the projection lens 110P.

Meanwhile, in FIG. 13, the wide-angle lens 110 is schematically shown. In addition, an integrator is disposed between the light source 115 and the dichroic mirror 12, but is not shown in FIG. 13.

White light from the light source 115 is decomposed into three colored light fluxes (red light, green light, and blue light) by the dichroic mirrors 12 and 13. The decomposed light fluxes are then incident on the transmission-type display devices 11a to 11c corresponding to the respective colored light fluxes through the capacitor lenses 16a to 16c, respectively, and are optically modulated. The modulated light fluxes are color-synthesized by the cross dichroic prism 14, and then are incident on the wide-angle lens 110. The wide-angle lens 110 projects an optical image of light optically modulated by the transmission-type display devices 11a to 11c onto a screen 105.

Figure 14:
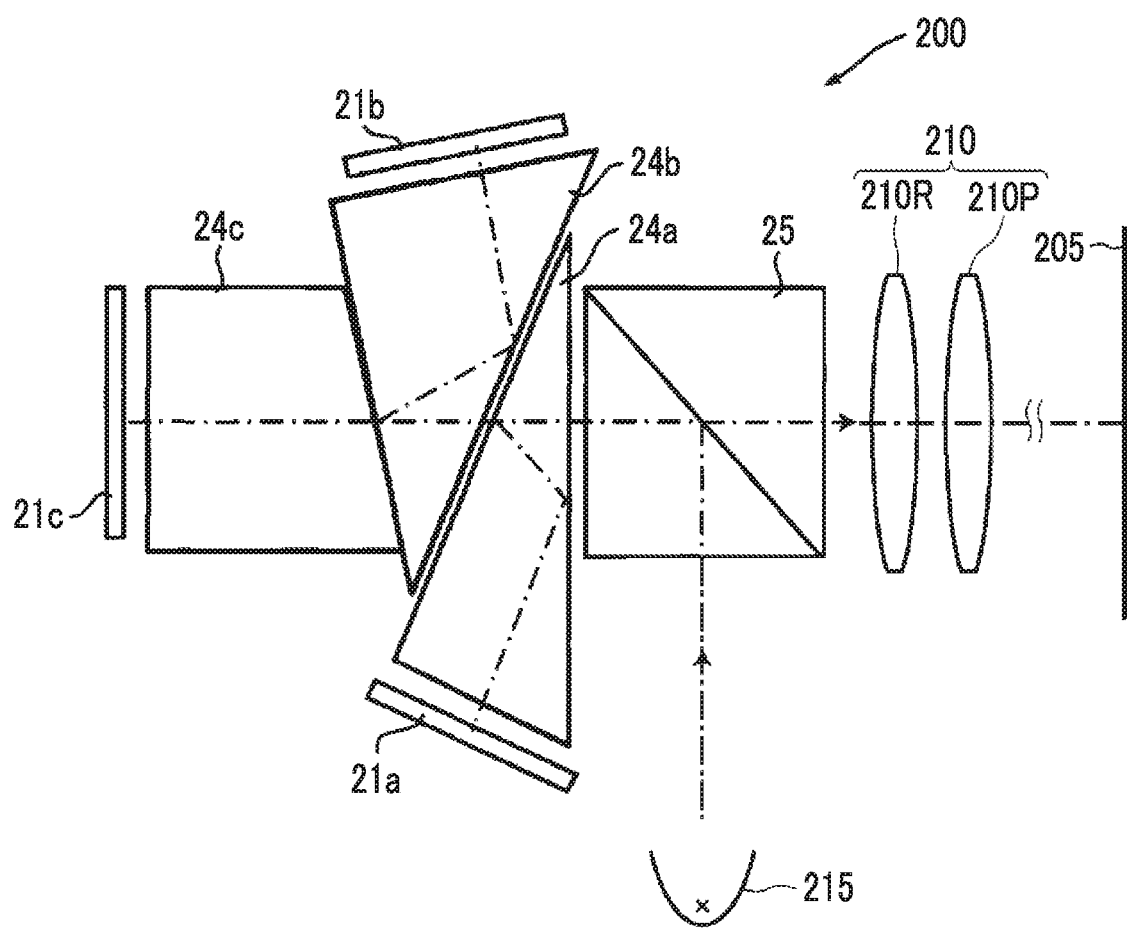
FIG. 14 is a schematic configuration diagram of a projection-type display apparatus according to another embodiment of the present invention.

FIG. 14 is a schematic configuration diagram of a projection-type display apparatus according to another embodiment of the present invention. A projection-type display apparatus 200 shown in FIG. 14 includes a wide-angle lens 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light.

The wide-angle lens 210 is composed of a projection lens 210P and a relay lens 210R. In addition, the light source 215, the DMDs (light valves) 21a to 21c, and the relay lens 210R are formed integrally with each other as a relay lens unit. This relay lens unit is configured to be attachable and detachable to and from the projection lens 210P.

Meanwhile, in FIG. 14, the wide-angle lens 210 is schematically shown. In addition, an integrator is disposed between the light source 215 and the polarization separation prism 25, but is not shown in FIG. 14.

White light from the light source 215 is reflected from a reflecting surface inside the polarization separation prism 25, and then is decomposed into three colored light fluxes (red light, green light, and blue light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the wide-angle lens 210. The wide-angle lens 210 projects an optical image of light optically modulated by the DMDs 21a to 21c onto a screen 205.

Figure 15:
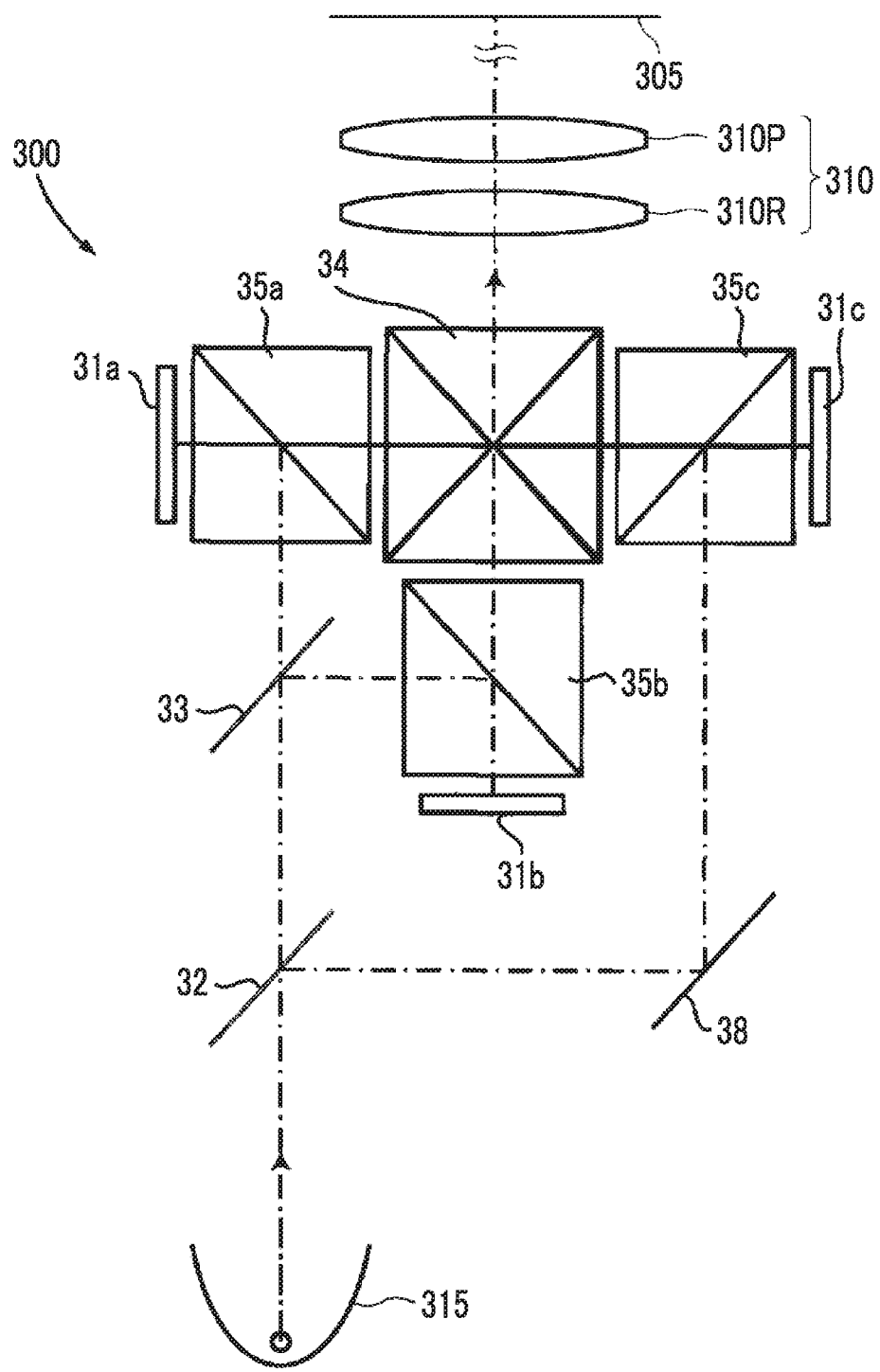
FIG. 15 is a schematic configuration diagram of a projection-type display apparatus according to still another embodiment of the present invention.

FIG. 15 is a schematic configuration diagram of a projection-type display apparatus according to still another embodiment of the present invention. A projection-type display apparatus 300 shown in FIG. 15 includes a wide-angle lens 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c.

The wide-angle lens 310 is composed of a projection lens 310P and a relay lens 310R. In addition, the light source 315, the reflection-type display devices (light valves) 31a to 31c, and the relay lens 310R are formed integrally with each other as a relay lens unit. This relay lens unit is configured to be attachable and detachable to and from the projection lens 310P.

Meanwhile, in FIG. 15, the wide-angle lens 310 is schematically shown. In addition, an integrator is disposed between the light source 315 and the dichroic mirror 32, but is not shown in FIG. 15.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the wide-angle lens 310. The wide-angle lens 310 projects an optical image of light optically modulated by the reflection-type display devices 31a to 31c onto a screen 305.

Hereinbefore, the present invention has been described through the embodiment and the examples, but the wide-angle lens of the embodiment of the present invention is not limited to those of the above examples, and can be variously modified. For example, it is possible to appropriately change the curvature radius, the surface distance, the refractive index, and the Abbe number of each lens.

In addition, the projection-type display apparatuses of the embodiment of the present invention are also not limited to the above configurations. For example, the light valves which are used and the optical members which are used for light flux separation or light flux synthesis are not limited to the above configurations, and can be modified in various forms. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

EXPLANATION OF REFERENCES 11a to 11c: transmission-type display device
12, 13, 32, 33: dichroic mirror
14, 34: cross dichroic prism
16a to 16c: capacitor lens
18a to 18c, 38: total reflection mirror
21a to 21c: DMD
24a to 24c: TIR prism
25, 35a to 35c: polarization separation prism
31a to 31c: reflection-type display device
100, 200, 300: projection-type display apparatus
105, 205, 305: screen
110, 210, 310: wide-angle lens
115, 215, 315: light source
Fa: on-axis light flux
Fb: light flux of maximum angle of view
MI: intermediate image
L1a to L2g: lens
P: projection lens
PP: optical member
Ra, Rb, Rc: relay lens
Sim: image display surface
Z: optical axis
What is claimed is:

1. A wide-angle lens comprising:
a projection lens which is disposed closer to a magnified side than an intermediate image; and
a relay lens which is disposed closer to a reduced side than the intermediate image, and is configured to be attachable and detachable to and from the projection lens,
wherein the following Conditional Expressions (1) and (2) are satisfied in a case where
a field curvature of a whole system at a maximum image height of the whole system is set to FC,
a field curvature of the relay lens at the maximum image height of the whole system is set to FC2, and
a focal length of the whole system is set to f.

$$0 < |FC/FC2| < 0.2 \qquad (1)$$

$$0.05 < |FC2/f| < 1 \qquad (2)$$

2. The wide-angle lens according to claim 1,
wherein a plurality of the relay lenses which are combined with the projection lens are provided, and
wherein in a case where any two relay lenses out of the plurality of relay lenses are combined with the projection lens, the following Conditional Expression (3) is satisfied in a case where
a back focus of the whole system is set to Bf,
a maximum image height of the whole system is set to I,
a lens having a larger value of Bf×I is set to a first relay lens, and a lens having a smaller value of Bf×I is set to a second relay lens,
a position at which a ray of light having a height I intersects an optical axis in the relay lens is set to a point SR in a case where the ray of light is caused to be incident in parallel with the optical axis from the reduced side of the relay lens,
a distance from the point SR in the first relay lens to a vertex of a surface closest to the reduced side is set to L2r(1),
a distance from the point SR in the second relay lens to the vertex of a surface closest to the reduced side is set to L2r(2),
a composite focal length of all lenses closer to the reduced side than the point SR in the first relay lens is set to f2r(1),
a composite focal length of all lenses closer to the reduced side than the point SR in the second relay lens is set to f2r(2),
a back focus of the whole system in a case where the first relay lens is combined with the projection lens is set to Bf(1),
a back focus of the whole system in a case where the second relay lens is combined with the projection lens is set to Bf(2),
a maximum image height of the whole system in a case where the first relay lens is combined with the projection lens is set to I(1), and
a maximum image height of the whole system in a case where the second relay lens is combined with the projection lens is set to I(2).

$$0.6 < \frac{\{L2r(1) * f2r(1)\}/\{Bf(1) * I(1)\}}{\{L2r(2) * f2r(2)\}/\{Bf(2) * I(2)\}} < 1.4 \qquad (3)$$

3. The wide-angle lens according to claim 1,
wherein the following Conditional Expression (1-1) is satisfied.

$$0 < |FC/FC2| < 0.1 \qquad (1-1)$$

4. The wide-angle lens according to claim 1,
wherein the following Conditional Expression (2-1) is satisfied.

$$0.1 < |FC2/f| < 0.5 \qquad (2-1)$$

5. The wide-angle lens according to claim 2,
wherein the following Conditional Expression (3-1) is satisfied.

$$0.8 < \frac{\{L2r(1) * f2r(1)\}/\{Bf(1) * I(1)\}}{\{L2r(2) * f2r(2)\}/\{Bf(2) * I(2)\}} < 1.2 \qquad (3-1)$$

6. A projection lens which is used in the wide-angle lens according to claim 1.

7. A relay lens which is used in the wide-angle lens according to claim 1.

8. A projection-type display apparatus, comprising:
a light valve from which an optical image is output based on image data; and
the wide-angle lens according to claim 1,
wherein the wide-angle lens projects the optical image, which is output from the light valve, onto a screen.

9. The projection-type display apparatus according to claim 8, wherein a relay lens unit in which the light valve and the relay lens are formed integrally with each other is provided, and wherein the relay lens unit is configured to be attachable and detachable to and from the projection lens.

10. A relay lens unit which is used in the projection-type display apparatus according to claim 9.

\* \* \* \* \*